(12) United States Patent
Pollack et al.

(10) Patent No.: US 6,571,238 B1
(45) Date of Patent: May 27, 2003

(54) SYSTEM FOR REGULATING FLOW OF INFORMATION TO USER BY USING TIME DEPENDENT FUNCTION TO ADJUST RELEVANCY THRESHOLD

(75) Inventors: Jordan Pollack, Sudbury, MA (US); Jeremy Stevenson, Waltham, MA (US); Zak Umanoff, Newton, MA (US)

(73) Assignee: Abuzz Technologies, Inc., Cambridge, MA (US)

( * ) Notice: Subject to any disclaimer, the term of this patent is extended or adjusted under 35 U.S.C. 154(b) by 0 days.

(21) Appl. No.: 09/330,505

(22) Filed: Jun. 11, 1999

(51) Int. Cl.$^7$ .............................. G06F 7/00; G06F 17/30
(52) U.S. Cl. ................................... 707/5; 707/3; 707/6
(58) Field of Search .............................. 707/1, 6, 4, 10, 707/201, 103 R, 5, 3; 706/11, 15

(56) References Cited

U.S. PATENT DOCUMENTS

| | | | |
|---|---|---|---|
| 5,283,856 A | | 2/1994 | Gross et al. |
| 5,555,346 A | * | 9/1996 | Gross et al. ................. 706/11 |
| 5,590,269 A | | 12/1996 | Kruse et al. ................. 395/209 |
| 5,619,648 A | | 4/1997 | Canale et al. .......... 395/200.01 |
| 5,642,502 A | | 6/1997 | Driscoll ........................ 395/605 |
| 5,649,186 A | | 7/1997 | Ferguson .................... 395/610 |
| 5,706,497 A | | 1/1998 | Takshashi et al. .......... 395/605 |
| 5,717,913 A | * | 2/1998 | Driscoll .......................... 707/4 |
| 5,724,567 A | | 3/1998 | Rose et al. |

(List continued on next page.)

OTHER PUBLICATIONS

Robert Kass, et al., "Intelligent Assistance for the Communication of Information in Large Organizations", pp. 171–178, EDS Center for Advanced Research, Apr. 1, 1999.

Ernst Lutz, et al., "MAFIA—An Active Mail–FIlter–Agent for an Intelligent Document Processing Support", pp. 235–251, Multi–User Interfaces and Applications, 1990.

Thomas W. Malone, et al., "The Information Lens: An Intelligent System for Information Sharing and Coordination", pp. 65–88, Lawrence Elbaum Associates, 1989.

Marx, et al., "CLUES: Dynamic Personalized Message Filtering", pp. 113–121, MIT Media Laboratory, Speech Research Group, 1996.

Irene Stadnyk, et al., "Modeling User's Interests in Information Filters", pp. 49–50, Communications of the ACM, vol. 35, No. 12, Dec. 1992.

http://www.echomail.com/html, 12 pages, Printed on Aug. 4, 1999 14:16:42.

Product Summary, Inference, Knowledge Creation.

U.S. Pending Publication No. U.S. 2002/0010804 A1, Publication Date: Jan. 24, 2002, (Sanghvi et al.).

U.S. Pending Publication No. U.S. 2002/0016735 A1, Publication Date: Feb. 7, 2002, (Runge et al.).

*Primary Examiner*—Le Hien Luu
(74) *Attorney, Agent, or Firm*—Wolf, Greenfield & Sacks, P.C.

(57) ABSTRACT

Method and apparatus for regulating a flow of information to one or more users is disclosed. A system includes a relevancy threshold for a user and an incoming message having a relevancy score, the relevancy score indicating a relevancy of the incoming message to the user. A method for regulating a flow of information to a user of the system is disclosed. The method determines whether the relevancy score of the incoming message satisfies the relevancy threshold, and delivers to the user message information derived from the incoming message and adjusting the relevancy threshold when the relevancy score of the incoming message satisfies the relevancy threshold. The method adjusts the relevancy threshold by an amount determined by a time-dependent function when the relevancy score of the incoming message does not satisfy the relevancy threshold.

53 Claims, 3 Drawing Sheets

U.S. PATENT DOCUMENTS

| | | | |
|---|---|---|---|
| 5,737,728 A | 4/1998 | Sisley et al. | 705/8 |
| 5,799,304 A * | 8/1998 | Miller | 707/201 |
| 5,819,267 A | 10/1998 | Uyama | 707/6 |
| 5,819,269 A | 10/1998 | Uomini | 707/7 |
| 5,822,527 A | 10/1998 | Post | 395/200.36 |
| 5,826,022 A | 10/1998 | Nielsen | |
| 5,867,799 A | 2/1999 | Lang et al. | 707/1 |
| 5,870,744 A | 2/1999 | Sprague | 707/9 |
| 5,909,679 A | 6/1999 | Hall | 707/4 |
| 5,999,932 A | 12/1999 | Paul | |
| 6,029,195 A * | 2/2000 | Herz | 707/10 |
| 6,052,709 A | 4/2000 | Paul | |
| 6,072,942 A | 6/2000 | Stockwell et al. | |
| 6,119,114 A * | 9/2000 | Smadja | 707/103 R |
| 6,189,002 B1 * | 2/2001 | Riotblat | 706/15 |
| 6,249,805 B1 | 6/2001 | Fleming, III | |
| 6,266,692 B1 | 7/2001 | Greenstein | |
| 6,393,423 B1 | 5/2002 | Goedken | |

* cited by examiner

SYSTEM FOR REGULATING FLOW OF INFORMATION TO USER BY USING TIME DEPENDENT FUNCTION TO ADJUST RELEVANCY THRESHOLD

RELATED APPLICATIONS

This application is related to the following commonly owned applications, some of which disclose subject matter related to the disclosure of the present application, and which are hereby incorporated by reference in their entirety:

U.S. Utility Patent Application Ser. No. 09/330,332 entitled "Method and Apparatus for Evaluating Relevancy of Messages to Users," filed concurrently herewith; and U.S. Utility Patent Application Ser. No. 09/330,779 entitled "Method and Apparatus for Distributing Information to Users," filed concurrently herewith.

BACKGROUND OF THE INVENTION

A variety of computer-based systems for facilitating communications among users have been developed. For example, electronic mail (email) systems allow users to send messages to one or more specified recipients. The specified recipients of a message may retrieve and read the message at any time, and may respond to the message or forward it to other users. Email systems typically provide the ability to create mailing lists to facilitate communication among groups of users having common roles or interests. News services (also referred to as "clipping services") deliver to users selected news articles covering topics of interest to the users. Such news services typically select which news articles to deliver to users by comparing words in the news articles to keywords provided by the users. Electronic bulletin board systems allow groups of users to create electronic bulletin boards, also referred to as "newsgroups," that typically correspond to a particular topic. Any user who subscribes to a newsgroup may post messages to the newsgroup and read messages posted to the newsgroup by other subscribed users. Electronic "chat rooms" enable users to communicate with each other in real-time by entering messages that are immediately communicated to and viewable by other users in the same chat room. The public Internet is increasingly being used as a medium for these and other forms of electronic communication.

One problem associated with such communication systems is that of "information overload." Users of such systems often find themselves presented with such a large volume of information (e.g., email messages or newsgroup postings) that they find it difficult or impossible to manually examine all of the information in order to identify the information that is relevant to them. As a result, users may fail to receive or read information that is relevant to them and to engage in potentially fruitful communications. Similarly, users who transmit information using such communications systems may fail to reach desirable recipients because such recipients are unable to separate relevant from irrelevant messages.

A variety of automated and semi-automated systems have been developed in an attempt to help users organize and filter information received using electronic communications systems. For example, some systems attempt to deliver messages only to users to whom the messages are relevant. Such systems typically allow each user to define a set of preferences that indicate the user's interests. Such preferences may, for example, include keywords that describe the user's interests. Typically, such systems store incoming messages in a database as they are received by the system. When a certain number of messages have been received, the system performs a query on the database using each user's preferences. Each query typically produces scores for the messages in the database indicating how relevant the messages are to users of the system. The system uses these scores to determine which messages stored in the database are sufficiently relevant to forward to the corresponding user.

One problem with such conventional systems is that they require that multiple messages be received by the system before the relevancies of the messages can be determined. This requirement delays the delivery of incoming messages to users of the system. Such systems may therefore not be appropriate for environments in which communications need to be delivered quickly, such as enterprise email systems.

A further problem with such conventional systems is that users of such systems have limited control over the number and frequency of messages they receive from the system. Defining user preferences using keywords primarily serves to define the subject matter in which the user is interested, but does not place any bounds on the number or frequency of messages that the system will deliver to the user. As a result, users of such systems may experience "down" times during which they are ready and willing to receive, read, and respond to messages but during which they receive few messages or none at all. Similarly, users of such systems may be overloaded by a flood of messages that match the users' preferences. Such systems, therefore, fail to address a primary aspect of the problem of information overload.

Similar problems arise in systems that allow users to define a fixed relevancy threshold for incoming messages. Such systems compare the computed relevancy score of each incoming message to the fixed relevancy threshold defined by each user to determine whether to forward the incoming message to each user. When the system receives a large number of messages that exceed a user's relevancy threshold, the user will be overwhelmed with incoming messages. Similarly, when the system receives few messages that exceed a user's relevancy threshold, the user will receive few messages, even if the user is willing and available to read additional messages. Use of fixed thresholds, therefore, does not allow the frequency with which messages are delivered to users to change in response to the frequency and relevancy of incoming messages or to the preferences or activity levels of users.

Some systems allow users to set a fixed limit on the number of incoming messages to be delivered to them periodically (e.g., each day). The problems associated with such systems are similar to those described above. For example, if a large number of highly-relevant messages are received by the system in one day, the user will fail to receive relevant messages. Similarly, if the system receives many low-relevancy messages in one day, the user will receive few messages during the day, even if the user is willing and available to read more messages. Such systems, therefore, fail to respond to users' changing preferences and activity levels of users.

SUMMARY OF THE INVENTION

A method for regulating a flow of information to a user is provided. The method is performed in a system that includes a relevancy threshold for the user and an incoming message having a relevancy score, the relevancy score indicating a relevancy of the incoming message to the user. The method includes steps of determining whether the relevancy score of the incoming message satisfies the relevancy threshold and delivering to the user message information derived from the incoming message and adjusting the relevancy threshold when the relevancy score of the incoming message satisfies the relevancy threshold. The method may further include a step of adjusting the relevancy threshold by an amount determined by a time-dependent function when the relevancy score of the incoming message does not satisfy the relevancy threshold. The step of delivering may include a step of adjusting the relevancy threshold by a function of the difference between the relevancy threshold and a maximum relevancy value. The step of delivering may include a step of adjusting the relevancy threshold by a function of the difference between the relevancy threshold and an amount determined by a time-dependent function of the relevancy threshold.

Another method for regulating a flow of information to a user is provided. The method is performed in a system including a relevancy threshold for the user and an incoming message having a relevancy score, the relevancy score indicating a relevancy of the incoming message to the user. The method includes steps of calculating the relevancy threshold as a function of time, determining whether the relevancy score of the incoming message satisfies the relevancy threshold, and delivering the incoming message to the user when the relevancy score of the incoming message satisfies the relevancy threshold. The step of calculating may include calculating the relevancy threshold as a function of time that is specified by the user. The step of calculating the relevancy threshold as a function of time that is specified by the user may include steps of receiving user volume input from the user, the user volume input indicating a desired frequency of message delivery to the user, and calculating the function of time based on the user volume input.

Another method for regulating a flow of information to a user is provided. The method is performed in a system including a relevancy threshold for the user and a plurality of incoming messages having relevancy scores, the relevancy scores indicating relevancies of the plurality of incoming messages to the user. The method includes a step of delivering to the user message information derived from at least some of the incoming messages having relevancy scores satisfying the relevancy threshold at a rate specified by the user. The step of delivering may include steps of calculating the relevancy threshold as a function of time, determining whether the relevancy scores of the incoming messages satisfy the relevancy threshold, delivering to the user message information derived from those incoming messages whose relevancy scores satisfy the relevancy threshold, adjusting the relevancy threshold when it is determined that at least one of the relevancy scores satisfies the relevancy threshold. The step of calculating the relevancy threshold as a function of time may include a step of calculating the relevancy threshold as a function of time that is specified by the user. The step of calculating the relevancy threshold as a function of time that is specified by the user may include steps of receiving user volume input from the user, the user volume input indicating a desired frequency of message delivery to the user, and calculating the function of time based on the user volume input. The step of adjusting the relevancy threshold may include a step of adjusting the relevancy threshold by a function of the difference between the relevancy threshold and a maximum relevancy value. The step of adjusting the relevancy threshold may include a step of adjusting the relevancy threshold by an amount specified by the user.

A system, computer-readable medium, and apparatus for regulating a flow of information to a user are also provided.

For example, a system is provided that includes a user profiles database including a relevancy threshold for the user, a relevancy engine to generate a relevancy score for an incoming message, the relevancy score indicating a relevancy of the incoming message to the user, and a salience engine to deliver to the user message information derived from the incoming message and to adjust the relevancy threshold when the relevancy score of the incoming message satisfies the relevancy threshold. Another system for regulating a flow of information to a user is provided, the system including a user profiles database including a relevancy threshold for the user, a relevancy engine to generate a relevancy score for an incoming message, the relevancy score indicating a relevancy of the incoming message to the user, and a salience engine to calculate the relevancy threshold as a function of time and to deliver to the user message information derived from the incoming message when the relevancy score of the incoming message satisfies the relevancy threshold. A further system for regulating a flow of information to a user is provided, the system including a user profiles database including a relevancy threshold for the user, a relevancy engine to generate relevancy scores for a plurality of incoming messages, the relevancy scores indicating relevancies of the incoming messages to the user, and a salience engine to deliver to the user message information derived from at least some of the incoming messages having relevancy scores satisfying the relevancy threshold at a rate specified by the user.

Other aspects of the invention include the various combinations of one or more of the foregoing aspects of the invention, as well as the combinations of one or more of the various embodiments thereof as found in the following detailed description or as may be derived therefrom. The foregoing aspects of the invention also have corresponding computer-implemented processes which are also aspects of the present invention. Other embodiments of the present invention may be derived by those of ordinary skill in the art both from the following detailed description of a particular embodiment of the invention and from the description and particular embodiment of a system in accordance with the invention.

DETAILED DESCRIPTION

A system is provided that regulates a flow of information to a plurality of users. The information may, for example, be electronic mail messages directed to the system or to individual users of the system. The users indicate their preferences for receipt of information, such as by indicating how frequently they wish to receive information. The system evaluates characteristics of units of incoming information and determines whether to forward the units of incoming information to particular users based on the users' expressed preferences and the characteristics of the incoming information. For example, in a system in which incoming units of information include incoming email messages, the system may evaluate the relevancy of an incoming email message to a user of the system and determine whether to forward the incoming email message to the user based on the relevancy of the message to the user, the time at which the user last received a message, and the user's expressed preferences for frequency of message delivery.

The system thus provides users with control over the frequency with which incoming information is delivered to them. To provide users with incoming information at the rates indicated by the users' preferences, the system maintains a salience value for each user of the system that specifies a floating relevancy threshold. An incoming unit of information is only delivered to a user if the relevancy of the unit of information to the user exceeds the user's relevancy threshold. The user's salience decays (decreases) over time at a rate specified by the user. As the user's salience decreases, so does the corresponding relevancy threshold, and the likelihood that an incoming unit of information will satisfy the user's relevancy threshold, and thus warrant delivery to the user, increases. When an incoming unit of information satisfies a user's relevancy threshold, the user's salience is increased, thus decreasing the likelihood that an incoming unit of information received by the system in the near future will satisfy the user's relevancy threshold and thus be delivered to the user. Users may interactively adjust their saliences to increase or decrease the frequency with which incoming units of information are delivered to them. This use of salience allows users to interactively influence the rate at which units of information are delivered to them.

The techniques described herein may be used in conjunction with systems for evaluating the relevancy of information to users, such as those described in U.S. Utility Patent Application Ser. No. 09/330,332 entitled "Method and Apparatus for Evaluating Relevancy of Messages to Users," filed concurrently herewith.

Figure 1:
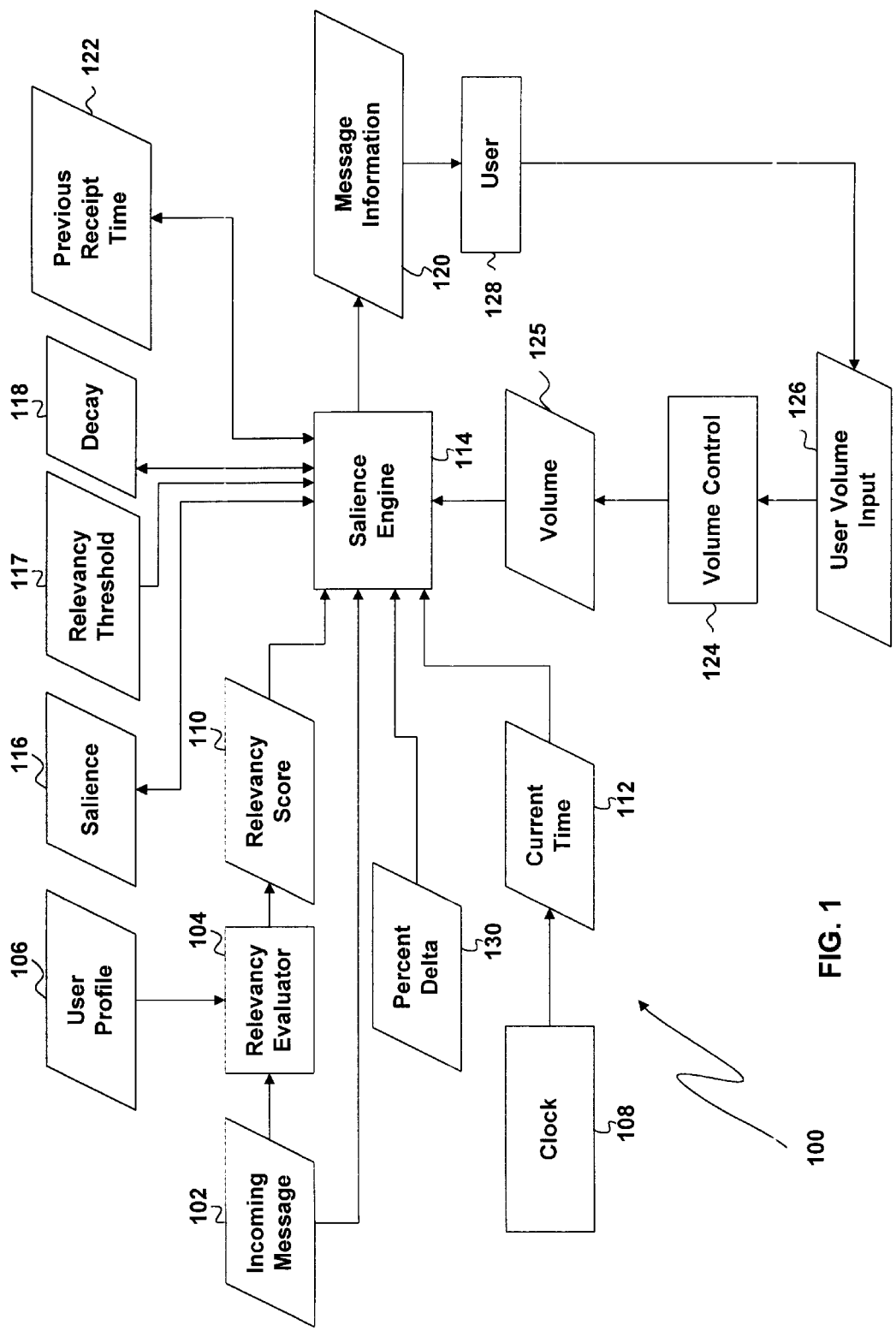
FIG. 1 is a dataflow diagram of a system for regulating a flow of information to a plurality of users.

Referring to FIG. 1, an example of a system 100 for regulating the flow of information to a plurality of users is shown. An incoming message 102 is received by the system. The incoming message 102 may, for example, be an electronic mail (email) message directed to one of the system's users. The incoming message 102 is delivered as an input to a relevancy evaluator 104. The relevancy evaluator 104 produces a relevancy score 110 based on the incoming message 102 and a user profile 106 indicating preferences of a user for messages previously received by the system 100. The system 100 may also serve a plurality of users, in which case the user profile 106 includes profiles for the plurality of users and the relevancy evaluator 104 produces relevancy scores for each of the plurality of users. Examples of ways in which the relevancy engine 104, the user profile 106, and the relevancy score 110 may be implemented are described in U.S. Utility Patent Application Ser. No. 09/330,332 entitled "Method and Apparatus for Evaluating Relevancy of Messages to Users," filed concurrently herewith. A clock 108 delivers the current time 112 as an input to a salience engine 114.

The salience engine 114 generates message information 120 for the user 128 based on the relevancy score 110, the current time 112, a previous receipt time 122 indicating the last time that message information was delivered to the user 128, a salience 116 for the user 128, and a volume 125 indicated by the user 128. The salience engine 114 determines whether the relevancy score 110 satisfies the user's relevancy threshold 117 (which the salience engine 114 derives from the user's salience 116 as described in more detail below). The salience engine 114 may deliver the message information 120 to the user 128 only if the relevancy score 110 satisfies the user's relevancy threshold 117. Alternatively, the salience engine 114 may always deliver the message information 120 to the user 128 and indicate in the message information 120 whether the relevancy score 110 satisfies the user's relevancy threshold 117. The salience engine 114 may generate and deliver message information to other users based on the other users' saliences and volumes. The salience engine 114 may, for example, be used to implement the delivery mechanism 118 shown in FIG. 1 of U.S. Utility Patent Application Ser. No. 09/330,332 entitled "Method and Apparatus for Evaluating Relevancy of Messages to Users," filed concurrently herewith.

The message information 120 may, for example, include the incoming message 102 or any information derived therefrom, such as a subject line, keywords, an abstract, or the current receipt time 112 of the incoming message 102. The salience 116, as described in more detail below, specifies the adaptive relevancy threshold 117 that is modified by the salience engine 114 in response to preferences expressed by the user 128 and the rate at which incoming messages are received by the system 100. The salience engine 114 may, for example, deliver the message information 120 to the user 128 only if the relevancy score 110 satisfies the user's relevancy threshold 117. A decay 118, as described in more detail below, is derived from the volume 125 specified by the user 128 and specifies how the salience 116 changes as a function of time.

The salience engine 114 may deliver the message information 120 to the user 128 in any manner. For example, the salience engine 114 may deliver the message information 120 to the user 128 as an email message. Alternatively, the salience engine 114 may maintain a message display for the user 128 that displays a predetermined number of messages that are most relevant to the user 128. For example, when the incoming message 102 is received by the system 100, the salience engine 114 may update the message display to include the message information 120 corresponding to the incoming message 102 only if the relevancy score 110 is greater than the relevancy score of a message currently displayed by the message display. In this way, the message display may be dynamically updated to display to the user those messages that are most relevant to him or her.

The user 128 may control the frequency with the salience engine 114 delivers message information to the user. The user 128 may, for example, provide user volume input 126 to a volume control 124 indicating how frequently the user 128 prefers to receive messages. The volume control 124 generates a volume 125 based on the user volume input 126. The volume 125 specifies the frequency with which the user 128 wishes to receive incoming messages. The volume 125 may range from $V_{Min}$ to $V_{Max}$. $V_{Min}$ and $V_{Max}$ may be any values, such as 0 and 1 or 1 and 10. Values of the volume 125 correspond to preferred frequencies of message delivery, such as one per hour or ten per day.

The volume control 124 may include any of a variety of means for receiving the user volume input 126 from the user 128. For example, the volume control 124 may provide a graphical user interface that includes controls for receiving input from the user 128 indicating the volume 125. For example, the graphical user interface may include a slider control or a rotating "volume knob" that the user 128 may use to increase or decrease the volume 125 using a standard input device such as a keyboard or mouse. The volume control 124 may, however, receive or derive the volume 125 from the user volume input 126 in any manner.

The salience engine 114 generates the message information 120 for the incoming message 102 and the user 128 based on the relevancy score 110 for the incoming message 102, the current time 112, the user's salience 116, and the user's volume 125. The salience engine 114 dynamically modifies the salience 116 based on characteristics of the incoming messages received by the system 100 (such as the frequency with which incoming messages are being received by the system 100) and the expressed preferences of the user 128 (as expressed, for example, in the user profiles 106 and the user volume input 126), as described in more detail below.

Figure 2:
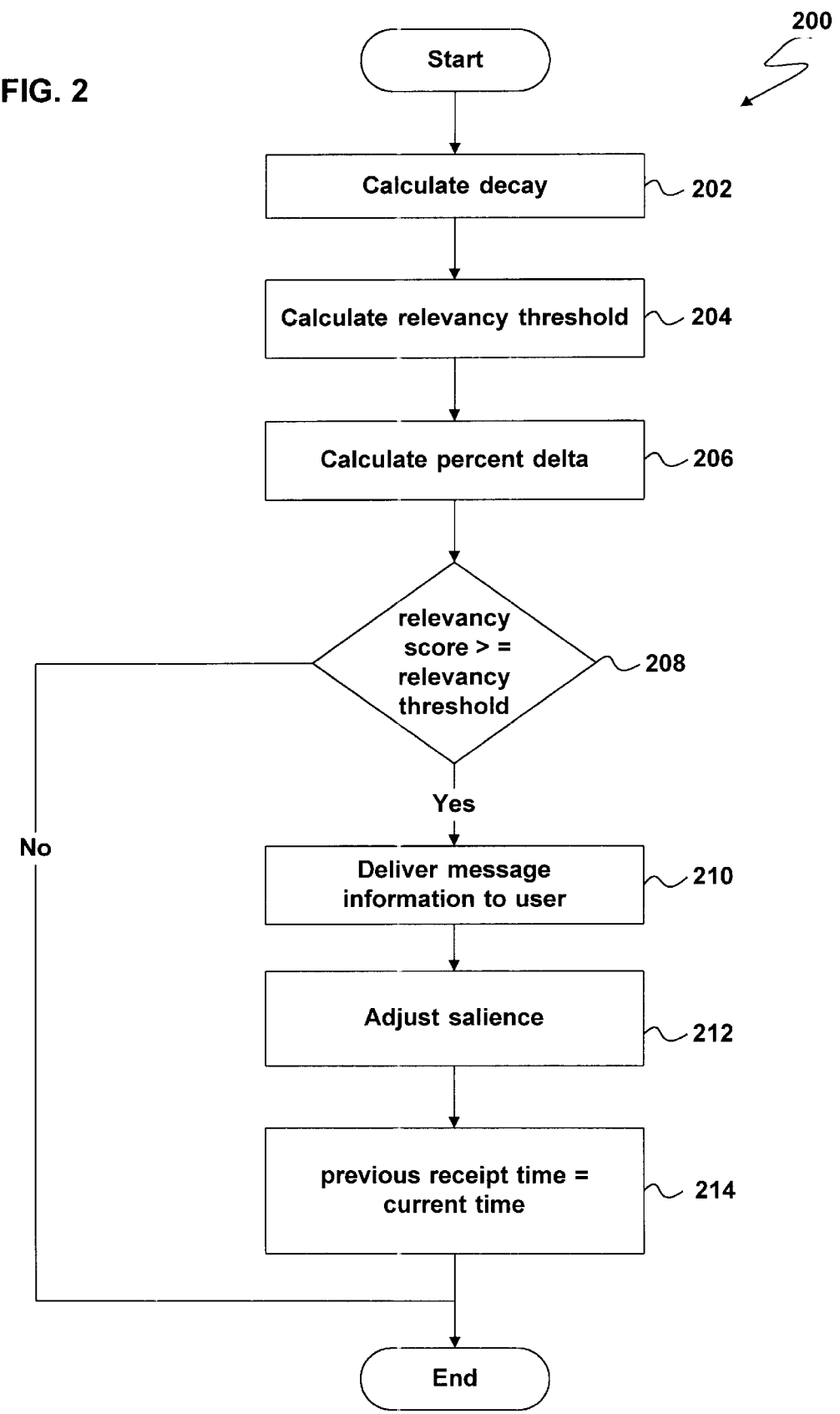
FIG. 2 is a flow chart of a process for regulating a flow of information to a user.

Referring to FIG. 2, one example of a process that the salience engine 114 may use to determine whether to deliver the message information 120 to the user 128 and to update the salience 116 is shown. The salience engine 114 calculates the decay 118 (step 202). As described above, the salience 116 decreases as a function of time. The decay 118 indicates how much the salience engine 114 should decrease the salience 116, based on the time that has passed since message information was last delivered to the user 128 (i.e., since the previous receipt time 122). The salience engine 114 may decrease the salience 116 using any function of time.

One way in which the salience engine 114 may calculate the decay 118 is as follows. Assume for purposes of example that the volume 125 specified by the user volume input 126 ranges from $V_{Min}=0$ to $V_{Max}=1$. If the volume 125 is equal to $V_{Max}$, then the salience engine 114 assigns a value of zero to the decay 118. Otherwise, the volume control 124 assigns a value to the decay 118 using the following formula:

$$decay=(1-(\log(1-V)/24)^{-(current\ time-previous\ time)},$$

where "current time" is the current time 112 obtained from, for example, the clock 108, and "previous time" is the previous message receipt time 122 for the user 128. As described in more detail below, the decay 118 is used as a scaling factor to decrease the salience 116 by an amount reflecting a decreasing function of time. Using this technique for deriving the decay 118 from the user volume input 126, the decay 118 forces the salience to zero if the volume 125 is equal to one, thus allowing all incoming messages to be passed on to the user 128. If the volume 125 is zero, then the decay 118 forces the salience 116 to one, thus preventing any incoming messages from being forwarded to the user 128.

Returning to FIG. 2, the salience engine 114 calculates the user's relevancy threshold 117 based on the user's salience 116 and the user's decay 118 (step 204). The salience engine 114 may, for example, calculate the relevancy threshold 117 as the product of the user's salience 116 and the user's decay 118. The salience engine 114 calculates a percent delta 130 that specifies how the salience 116 is to be adjusted (i.e., increased or decreased) if the relevancy score 110 satisfies the user's relevancy threshold 117 (step 206). The salience engine 114 may, for example, calculate the percent delta 130 from the user's salience 116, decay 118, and the relevancy score 110 using the following formula:

$$percent\ delta=min((relevancy\ score-(salience*decay))/(salience-(salience*decay)),1)$$

The salience engine 114 may, however, calculate a value for the percent delta 130 in any manner. Furthermore, the percent delta 130 may be partially or entirely specified by the user 128.

If the relevancy score 110 is greater than or equal to the user's relevancy threshold 117 (step 208), then the salience engine 114 delivers the message information 120 to the user 128 (step 210), adjusts the salience 116 (step 212), and updates the previous receipt time 122 to be equal to the current time 112 (step 214). If the relevancy score 110 is less than the user's relevancy threshold 117, the salience engine 114 does not deliver the message information 120 to the user 128.

Figure 3:
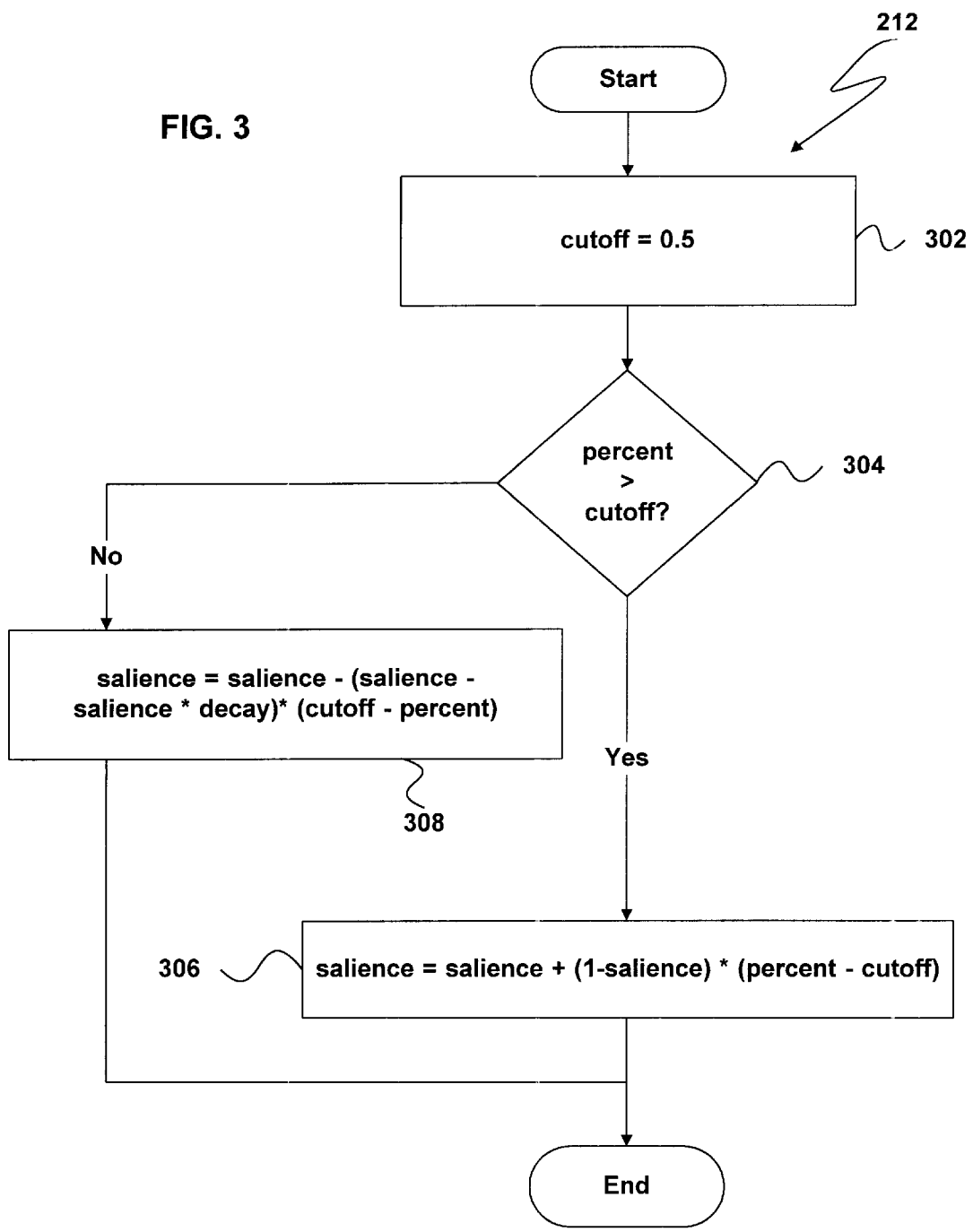
FIG. 3 is a flow chart of a process for implementing aspects of the process shown in FIG. 2.

Referring to FIG. 3, an example of a process for adjusting the salience 116 after delivering the message information 120 to the user 128 (step 212 in FIG. 2) is shown. The process shown in FIG. 3 either increases or decreases the salience 116, depending on the amount of time that has passed since message information was last delivered to the user 128. If message information was delivered to the user 128 relatively recently (i.e., if the user receives message information for a second incoming message relatively quickly after receiving message information for a first incoming message), the salience 116 is increased. If a relatively long amount of time has passed since message information was previously delivered to the user 128, the user's salience 116 is increased. In this way, the system 100 balances the user's desire to obtain relevant information against the user's desire to not be overloaded with information. The process shown in FIG. 3 is provided as an example of a way in which the salience 116 may be adjusted to achieve this balance.

The salience engine 114 initializes a variable named cutoff to a value of 0.5 (step 302). The variable cutoff, as described in more detail below, is used by the salience engine 114 in the process of determining whether to increase or decrease the value of the user's salience 116. Use of the variable cutoff is provided merely as an example of a way in which this determination may be made. Similarly, the variable cutoff may be initialized to any value, and the initial value of 0.5 is provided merely as an example.

If the value of the percent delta 130 is greater than the value of cutoff (step 304), then the salience engine 114 increases the value of the salience 116 using the following formula:

$$salience=salience+(1-salience)*(percent\ delta-cutoff)$$

(step 306). If the value of the percent delta 130 is less than or equal to the value of cutoff (step 304), then the salience engine 114 decreases the value of the salience 116 using the following formula:

$$salience=salience-(salience-salience*decay)*(cutoff-percent)$$

(step 308). The process shown in FIG. 3 adjusts the value of the salience 116 in proportion to the difference between the relevancy score 110 and the relevancy threshold 117. The process shown in FIG. 3, however, is shown merely for purposes of example. The salience engine 114 may use any process to adjust the value of the salience 116.

As described above, when the system 100 includes a plurality of users, a salience, volume, and previous receipt time may be associated with each of the plurality of users. When the incoming message is received 102, the salience engine 114 may monitor the number of users whose relevancy thresholds are satisfied by the corresponding relevancy score of the incoming message 102. The salience engine 114 may use a priority system to select a subset of this number of users and only deliver the message information 120 to this subset of users. The salience engine 114 may, for example, perform load balancing among the plurality of users to distribute the message information 120 among the users to whom the incoming message 102 is particularly relevant in order to prevent any individual user from being overwhelmed with information. The salience engine 114 may use any priority system to determine to which users to deliver the message information based on the relevancy scores of the incoming message 102, the users' saliences, volumes, and previous receipt times, and other information.

The system 100 shown in FIG. 1 has a number of benefits and advantages. For example, by thresholding the relevancy score 110, the system 100 may deliver to the user only those messages that are particularly relevant to him or her. If users of the system 100 typically receive a large number of messages, including a large number of messages that are not sufficiently relevant to them to warrant attention, filtering of insufficiently relevant messages may allow such users to avoid spending a significant amount of time evaluating and/or reading insufficiently relevant messages.

A further advantage of the system 100 is that it may generate the message information 120 for the incoming message 102 without waiting to receive subsequent incoming messages. Conventional systems typically must queue a number of incoming messages before they can generate relevancies for the incoming messages. Such queuing increases the delay between the time that an incoming message is received and the time that the incoming message can be filtered and otherwise processed by the system. The system 100, in contrast, may evaluate the relevancy of a single incoming message (such as the incoming message 102) and deliver or otherwise process the incoming message 102 by itself, before receiving or processing any other incoming messages. As a result, results of evaluating the relevancy of the incoming message 102 may be communicated immediately to users of the system 100, such as by delivering the incoming message 102 to those users for whom the incoming message 102 is sufficiently relevant. Results of evaluating the relevancy of the incoming message 102 may also be communicated to users of the system 100 in other ways, such as by notifying the users of the results by email, facsimile, or telephone.

One advantage of the salience engine 114 is that it provides the users of the system 100 with interactive control over the frequency with which messages and other information are delivered to them. Systems that allow users to select a fixed relevancy threshold run the risk of providing users with a flood of messages during periods when a large volume of high-relevancy messages are receiving, and similarly run the risk of providing users with too few messages during periods when mostly low-relevancy messages are received. By providing users of the system 100 with the volume control 124 to control the volume (i.e., frequency) of message delivery, the system 100 balances the desire of the user to limit the number of messages received with the need to deliver high-relevancy messages to the user and the desire to deliver lower-relevancy messages to the user when the user is available to read them. Because the volume 125 may be interactively modified by the user and the frequency of message delivery is immediately affected by modification of the volume 125, the user may change the frequency of message delivery, e.g., throughout the day, to suit the user's preferences and availability.

A further advantage of the salience engine 114 is that the only state information that it needs to maintain for the user 128 is the user's salience 116, the previous receipt time 122 of a message by the user 128, and the user's volume 125, regardless of the frequency of incoming messages being received by the system or the number of incoming messages previously received by the system. Such state information will typically require only a small and constant amount of memory to store. Using such state information to regulate the flow of information to the user 128 therefore requires relatively little memory, regardless of the frequency of incoming messages or the number of messages previously received by the user. If the system 100 includes a plurality of users, the system 100 need only maintain the state information described above for each of the users. Memory requirements of the system 100 therefore remain relatively low even when the system has a large number of users.

A computer system for implementing the system 100 of FIG. 1 typically includes at least one main unit connected to both an output device which displays information to a user and an input device which receives input from a user. The main unit may include a processor connected to a memory system via an interconnection mechanism. The input device and output device also are connected to the processor and memory system via the interconnection mechanism.

It should be understood that one or more output devices may be connected to the computer system. Example output devices include cathode ray tubes (CRT) display, liquid crystal displays (LCD) and other video output devices, printers, communication devices such as a modem, storage devices such as a disk or tape, and audio output. It should also be understood that one or more input devices may be connected to the computer system. Example input devices include a keyboard, keypad, track ball, mouse, pen and tablet, communication device, and data input devices such as audio and video capture devices. It should be understood that the invention is not limited to the particular input or output devices used in combination with the computer system or to those described herein.

The computer system may be a general purpose computer system which is programmable using a computer programming language, such as C, C++, Java, or other language, such as a scripting language or even assembly language. The computer system may also be specially programmed, special purpose hardware, or an application specific integrated circuit (ASIC). In a general purpose computer system, the processor is typically a commercially available processor, of which the series x86 and Pentium series processors, available from Intel, and similar devices from AMD and Cyrix, the 680X0 series microprocessors available from Motorola, the PowerPC microprocessor from IBM and the Alpha-series processors from Digital Equipment Corporation, and the MIPS microprocessor from MIPS Technologies are examples. Many other processors are available. Such a microprocessor executes a program called an operating system, of which Windows NT, Windows 95 or 98, IRIX, UNIX, Linux, DOS, VMS, MacOS and OS8 are examples, which controls the execution of other computer programs and provides scheduling, debugging, input/output control, accounting, compilation, storage assignment, data management and memory management, and communication control and related services. The processor and operating system defines computer platform for which application programs in high-level programming languages are written.

A memory system typically includes a computer readable and writeable nonvolatile recording medium, of which a magnetic disk, a flash memory, and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk after processing is completed. A variety of mechanisms are known for managing data movement between the disk and the integrated circuit memory element, and the invention is not limited thereto. It should also be understood that the invention is not limited to a particular memory system.

Such a system may be implemented in software or hardware or firmware, or any combination thereof. The various elements of the system, either individually or in combination may be implemented as a computer program product tangibly embodied in a machine-readable storage device for execution by a computer processor. Various steps of the process may be performed by a computer processor executing a program tangibly embodied on a computer-readable medium to perform functions by operating on input and generating output. Computer programming languages suitable for implementing such a system include procedural programming languages, object-oriented programming languages, and combinations of the two.

It should be understood that invention is not limited to a particular computer platform, particular processor, or particular high-level programming language. Additionally, the computer system may be a multiprocessor computer system or may include multiple computers connected over a computer network. It should be understood that each module or step shown in the accompanying figures may correspond to separate modules of a computer program, or may be separate computer programs. Such modules may be operable on separate computers.

The foregoing description of a few embodiments is merely illustrative and not limiting, having been presented by way of example only. Numerous modifications and other embodiments are within the scope of one of ordinary skill in the art and are contemplated as falling within the scope of the invention.

What is claimed is:

1. In a system including a relevancy threshold for a user and an incoming message having a relevancy score, the relevancy score indicating a relevancy of the incoming message to the user, a method for regulating a flow of information to the user, the method comprising steps of:
   (A) determining whether the relevancy score of the incoming message satisfies the relevancy threshold;
   (B) delivering to the user message information derived from the incoming message and adjusting the relevancy threshold when the relevancy score of the incoming message satisfies the relevancy threshold; and
   (C) adjusting the relevancy threshold by an amount determined by a time-dependent function when the relevancy score of the incoming message does not satisfy the relevancy threshold.

2. In a system including a relevancy threshold for a user and an incoming message having a relevancy score, the relevancy score indicating a relevancy of the incoming message to the user, a method for regulating a flow of information to the user, the method comprising steps of:
   (A) determining whether the relevancy score of the incoming message satisfies the relevancy threshold; and
   (B) delivering to the user message Information derived from the incoming message and adjusting the relevancy threshold when the relevancy score of the incoming message satisfies the relevancy threshold,
      wherein the step (B) comprises a step of:
         (B)(1) adjusting the relevancy threshold by a function of the difference between the relevancy threshold and a maximum relevancy value.

3. In a system including a relevancy threshold for a user and an incoming message having a relevancy score, the relevancy score indicating a relevancy of the incoming message to the user, a method for regulating a flow of information to the user, the method comprising steps of:
   (A) determining whether the relevancy score of the incoming message satisfies the relevancy threshold; and
   (B) delivering to the user message information derived from the incoming message and adjusting the relevancy threshold when the relevancy score of the incoming message satisfies the relevancy threshold,
      wherein the step (B) comprises a step of:
         (B)(1) adjusting the relevancy threshold by a function of the difference between the relevancy threshold and an amount determined by a time-dependent function of the relevancy threshold.

4. In a system including a relevancy threshold for a user and an incoming message having a relevancy score, the relevancy score indicating a relevancy of the incoming message to the user, a method for regulating a flow of information to the user, the method comprising steps of:
   (A) calculating the relevancy threshold as a function of time;
   (B) determining whether the relevancy score of the incoming message satisfies the relevancy threshold; and
   (C) delivering the incoming message to the user when the relevancy score of the incoming message satisfies the relevancy threshold.

5. The method of claim 4, wherein the step (A) comprises a step of:
   (A)(1) calculating the relevancy threshold as a function of time that is specified by the user.

6. The method of claim 5, wherein the step (A)(1) comprises steps of:
   receiving user volume input from the user, the user volume input indicating a desired frequency of message delivery to the user; and
   calculating the function of time based on the user volume input.

7. In a system including a relevancy threshold for a user and a plurality of incoming messages having relevancy scores, the relevancy scores indicating relevancy's of the plurality of incoming messages to the user, a method for regulating a flow of information to the user, the method comprising a step of:
   (A) delivering to the user message information derived from at least some of the incoming messages having relevancy scores satisfying the relevancy threshold at a rate specified by the user, wherein the step (A) comprises steps of:
      (A)(1) calculating the relevancy threshold as a function of time;
      (A)(2) determining whether the relevancy scores of the incoming messages satisfy the relevancy threshold;
      (A)(3) delivering to the user message information derived from those incoming messages whose relevancy scores satisfy the relevancy threshold; and
      (A)(4) adjusting the relevancy threshold when it is determined in the step (A)(2) that at least one of the relevancy scores satisfies the relevancy threshold.

8. The method of claim 7, wherein the step (A)(1) comprises a step of:
(A)(1)(a) calculating the relevancy threshold as a function of time that is specified by the user.

9. The method of claim 8, wherein the step (A)(1)(a) comprises steps of:
receiving user volume input from the user, the user volume input indicating a desired frequency of message delivery to the user; and
calculating the function of time based on the user volume input.

10. The method of claim 7, wherein the step (A)(4) comprises a step of:
adjusting the relevancy threshold by a function of the difference between the relevancy threshold and a maximum relevancy value.

11. The method of claim 7, wherein the step (A)(4) comprises a step of:
adjusting the relevancy threshold by an amount specified by the user.

12. A method for regulating a flow of information to a user, the method comprising steps of:
(A) maintaining, in a constant number of storage locations in a computer-readable memory, values corresponding to a relevancy threshold for the user, a volume indicating a frequency of message delivery desired by the user, and a previous receipt time indicating a time at which a message was last delivered to the user; and
(B) determining whether to deliver incoming messages to the user based on the relevancy threshold, the volume, and the previous receipt time.

13. The method of claim 12, wherein the incoming messages have relevancy scores indicating relevancies of the incoming messages to the user, and wherein the step (B) comprises steps of:
(B)(1) determining whether the relevancy scores of the incoming messages satisfy the relevancy threshold; and
(B)(2) delivering to the user message information derived from the incoming messages whose relevancy scores satisfy the relevancy threshold.

14. The method of claim 12, wherein the step (B) comprises a step of:
(B)(1) generating a decay value as a function of the volume and the previous receipt time; and
(B)(2) adjusting the relevancy threshold by the decay value.

15. A system for regulating a flow of information to a user, the system comprising:
a user profiles database including a relevancy threshold for the user;
a relevancy engine to generate a relevancy score for an incoming message, the relevancy score indicating a relevancy of the incoming message to the user; and
a salience engine to deliver to the user message information derived from the incoming message and to adjust the relevancy threshold when the relevancy score of the incoming message satisfies the relevancy threshold,
wherein the salience engine is adapted to adjust the relevancy threshold by an amount determined by a time-dependent function when the relevancy score of the incoming message does not satisfy the relevancy threshold.

16. A system for regulating a flow of information to a user, the system comprising:
a user profiles database including a relevancy threshold for the user;
a relevancy engine to generate a relevancy score for an incoming message, the relevancy score indicating a relevancy of the incoming message to the user; and
a salience engine to deliver to the user message information derive from the incoming message and to adjust the relevancy threshold when the relevancy score of the incoming message satisfies the relevancy threshold,
wherein the salience engine is adapted to adjust the relevancy threshold by a function of the difference between the relevancy threshold and a maximum relevancy value.

17. A system for regulating a flow of information to a user, the system comprising:
a user profiles database including a relevancy threshold for the user;
a relevancy engine to generate a relevancy score for an incoming message, the relevancy score indicating a relevancy of the incoming message to the user; and
a salience engine to deliver to the user message information derived from the incoming message and to adjust the relevancy threshold when the relevancy score of the incoming message satisfies the relevancy threshold,
wherein the salience engine is adapted to adjust the relevancy threshold by a function of the difference between the relevancy threshold and an amount determined by a time-dependent function of the relevancy threshold.

18. A system for regulating a flow of information to a user, the system comprising:
a user profiles database including a relevancy threshold for the user;
a relevancy engine to generate a relevancy score for an incoming message, the relevancy score indicating a relevancy of the incoming message to the user; and
a salience engine to calculate the relevancy threshold as a function of time and to deliver to the user message information derived from the incoming message when the relevancy score of the incoming message satisfies the relevancy threshold.

19. The system of claim 18, wherein the salience engine is adapted to calculate the relevancy threshold as a function of time that is specified by the user.

20. The system of claim 19, wherein the salience engine is adapted to receive user volume input from the user, the user volume input indicating a desired frequency of message delivery to the user, and wherein the salience engine is adapted to calculate the function of time based on the user volume input.

21. A system for regulating a flow of information to a user, the system comprising:
a user profiles database including a relevancy threshold for the user; a relevancy engine to generate relevancy scores for a plurality of incoming messages, the relevancy scores indicating relevancy's of the incoming messages to the user; and
a salience engine to deliver to the user message information derived from at least some of the incoming messages having relevancy scores satisfying the relevancy threshold at a rate specified by the user; and
wherein the salience engine is adapted to calculate the relevancy threshold as a function of time, determine whether the relevancy scores of the incoming messages satisfy the relevancy threshold, deliver to the user message information derived from those incoming messages whose relevancy scores satisfy the relevancy threshold, and adjust the relevancy threshold when it is determined that at least one of the relevancy scores satisfies the relevancy threshold.

22. The system of claim 21, wherein the salience engine is adapted to calculate the relevancy threshold as a function of time that is specified by the user.

23. The system of claim 22, wherein the salience engine is adapted to receive user volume input from the user, the user volume input indicating a desired frequency of message delivery to the user; and wherein the salience engine is adapted to calculate the function of time based on the user volume input.

24. The system of claim 22, wherein the salience engine is adapted to adjust the relevancy threshold by a function of the difference between the relevancy threshold and a maximum relevancy value.

25. The system of claim 22, wherein the salience engine is adapted to adjust the relevancy threshold by an amount specified by the user.

26. A system for regulating a flow of information to a user, the system comprising:
   at least one computer-readable memory storing, in a constant number of storage locations, values corresponding to a relevancy threshold for the user, a volume indicating a frequency of message delivery desired by the user, and a previous receipt time indicating a time at which a message was last delivered to the user; and
   a salience engine to determine whether to deliver incoming messages to the user based on the relevancy threshold, the volume, and the previous receipt time.

27. The system of claim 26, further comprising:
   a relevancy engine to generate relevancy scores indicating relevancies of the incoming messages to the user;
   and wherein the salience engine is adapted to determine whether the relevancy scores of the incoming messages satisfy the relevancy threshold and to deliver to the user message information derived from the incoming messages whose relevancy scores satisfy the relevancy threshold.

28. The system of claim 26, wherein the salience engine is adapted to generate a decay value as a function of the volume and the previous receipt time, and to adjust the relevancy threshold by the decay value.

29. A system for regulating a flow of information to a user, the system comprising:
   means for storing a relevancy threshold for the user;
   means for receiving an incoming message having a relevancy score, the relevancy score indicating a relevancy of the incoming message to the user;
   means for determining whether the relevancy score of the incoming message satisfies the relevancy threshold;
   means for delivering to the user message information derived from the incoming message and adjusting the relevancy threshold when the relevancy score of the incoming message satisfies the relevancy threshold; and
   means for adjusting the relevancy threshold by an amount determined by a time-dependent function when the relevancy score of the incoming message does not satisfy the relevancy threshold.

30. A system for regulating a flow of information to a user, the system comprising:
   means for storing a relevancy threshold for the user;
   means for receiving an incoming message having a relevancy score, the relevancy score indicating a relevancy of the incoming message to the user;
   means for determining whether the relevancy score of the incoming message satisfies the relevancy threshold; and
   means for delivering to the user message information derived from the incoming message and adjusting the relevancy threshold when the relevancy score of the incoming message satisfies the relevancy threshold,
   wherein the means for delivering comprises:
      means for adjusting the relevancy threshold by a function of the difference between the relevancy threshold and a maximum relevancy value.

31. A system for regulating a flow of information to a user, the system comprising:
   means for storing a relevancy threshold for the user;
   means for receiving an incoming message having a relevancy score, the relevancy score indicating a relevancy of the incoming message to the user;
   means for determining whether the relevancy score of the incoming message satisfies the relevancy threshold; and
   means for delivering to the user message information derived from the incoming message and adjusting the relevancy threshold when the relevancy score of the incoming message satisfies the relevancy threshold,
   wherein the means for delivering comprises:
      means for adjusting the relevancy threshold by a function of the difference between the relevancy threshold and an amount determined by a time-dependent function of the relevancy threshold.

32. A system for regulating a flow of information to a user, the system comprising:
   means for storing a relevancy threshold for the user;
   means receiving an incoming message having a relevancy score, the relevancy score indicating a relevancy of the incoming message to the user;
   means for calculating the relevancy threshold as a function of time;
   means for determining whether the relevancy score of the incoming message satisfies the relevancy threshold; and
   means for delivering to the user message information derived from the incoming message when the relevancy score of the incoming message satisfies the relevancy threshold.

33. The system of claim 32, wherein the means for calculating comprises:
   means for calculating the relevancy threshold as a function of time that is specified by the user.

34. The system of claim 33, wherein the means for calculating comprises:
   means for receiving user volume input from the user, the user volume input indicating a desired frequency of message delivery to the user; and
   means for calculating the function of time based on the user volume input.

35. A system for regulating a flow of information to a user, the system comprising:
   means for storing a relevancy threshold for the user;

means for receiving a plurality of incoming messages having relevancy scores, the relevancy scores indicating relevancy's of the plurality of incoming messages to the user;

means for delivering to the user message information derived from at least some of the incoming messages having relevancy scores satisfying the relevancy threshold at a rate specified by the user; and wherein the means for delivering comprises:

means for calculating the relevancy threshold as a function of time;

means for determining whether the relevancy scores of the incoming messages satisfy the relevancy threshold;

means for delivering to the user message information derived from those incoming messages whose relevancy scores satisfy the relevancy threshold; and means for adjusting the relevancy threshold when it is determined that at least one of the relevancy scores satisfies the relevancy threshold.

36. The system of claim 35, wherein the means for calculating comprises:

means for calculating the relevancy threshold as a function of time that is specified by the user.

37. The system of claim 36, wherein the means for calculating comprises:

means for receiving user volume input from the user, the user volume input indicating a desired frequency of message delivery to the user; and means for calculating the function of time based on the user volume input.

38. The system of claim 35, wherein the means for adjusting comprises:

means for adjusting the relevancy threshold by a function of the difference between the relevancy threshold and a maximum relevancy value.

39. The system of claim 35, wherein the means for adjusting comprises:

means for adjusting the relevancy threshold by an amount specified by the user.

40. A system for regulating a flow of information to a user, the system comprising:

means for maintaining, in a constant number of storage locations in a computer-readable memory, values corresponding to a relevancy threshold for the user, a volume indicating a frequency of message delivery desired by the user, and a previous receipt time indicating a time at which a message was last delivered to the user; and means for determining whether to deliver incoming messages to the user based on the relevancy threshold, the volume, and the previous receipt time.

41. The system of claim 40, wherein the incoming messages have relevancy scores indicating relevancies of the incoming messages to the user, and wherein the means for determining comprises:

means for determining whether the relevancy scores of the incoming messages satisfy the relevancy threshold; and means for delivering to the user message information derived from the incoming messages whose relevancy scores satisfy the relevancy threshold.

42. The system of claim 40, wherein the means for determining comprises:

means for generating a decay value as a function of the volume and the previous receipt time; and means for adjusting the relevancy threshold by the decay value.

43. A computer-readable medium encoded with a program for execution on a computer system including a relevancy threshold for a user and an incoming message having a relevancy score, the relevancy score indicating a relevancy of the incoming message to the user, the program, when executed on the computer system, performs a method for regulating a flow of information to the user, the method comprising steps of:

(A) determining whether the relevancy score of the incoming message satisfies the relevancy threshold;

(B) delivering to the user message information derived from the incoming message and adjusting the relevancy threshold when the relevancy score of the incoming message satisfies the relevancy threshold; and (C) adjusting the relevancy threshold by an amount determined by a time-dependent function when the relevancy score of the incoming message does not satisfy the relevancy threshold.

44. A computer-readable medium encoded with a program for execution on a computer system including a relevancy threshold for a user and an incoming message having a relevancy score, the relevancy score indicating a relevancy of the incoming message to the user, the program, when executed on the computer system, performs a method for regulating a flow of information to the user, the method comprising steps of:

(A) determining whether the relevancy score of the incoming message satisfies the relevancy threshold; and (B) delivering to the user message information derived from the incoming message and adjusting the relevancy threshold when the relevancy score of the incoming message satisfies the relevancy threshold, wherein the step (B) comprises a step of:

(B)(1) adjusting the relevancy threshold by a function of the difference between the relevancy threshold and a maximum relevancy value.

45. A computer-readable medium encoded with a program for execution on a computer system including a relevancy threshold for a user and an incoming message having a relevancy score, the relevancy score indicating a relevancy of the incoming message to the user, the program, when executed on the computer system, performs a method for regulating a flow of information to the user, the method comprising steps of:

(A) determining whether the relevancy score of the incoming message satisfies the relevancy threshold; and (B) delivering to the user message information derived from the incoming message and adjusting the relevancy threshold when the relevancy score of the incoming message satisfies the relevancy threshold, wherein the step (B) comprises a step of:

(B)(1) adjusting the relevancy threshold by a function of the difference between the relevancy threshold and an amount determined by a time-dependent function of the relevancy threshold.

46. A computer-readable medium encoded with a program for execution on a computer system including a relevancy threshold for a user and an incoming message having a relevancy score, the relevancy score indicating a relevancy of the incoming message to the user, the program, when executed on the computer system, executes a method for regulating a flow of information to the user, the method comprising steps of:

(A) calculating the relevancy threshold as a function of time;

(B) determining whether the relevancy score of the incoming message satisfies the relevancy threshold; and (C) delivering to the user message information derived from the incoming message when the relevancy score of the incoming message satisfies the relevancy threshold.

47. The computer-readable medium of claim 46, wherein the step (A) comprises a step of:

(A)(1) calculating the relevancy threshold as a function of time that is specified by the user.

48. The computer-readable medium of claim 47, wherein the step (A)(1) comprises steps of:

receiving user volume input from the user, the user volume input indicating a desired frequency of message delivery to the user; and calculating the function of time based on the user volume input.

49. A computer-readable medium encoded with a program for execution on a computer system including a relevancy threshold for the user and a plurality of incoming messages having relevancy scores, the relevancy scores indicating relevancy's of the plurality of incoming messages to the user, the program, when executed on the computer system, performs a method for regulating a flow of information to the user, the method comprising a step of:

(A) delivering to the user message information derived from at least some of the incoming messages having relevancy scores satisfying the relevancy threshold at a rate specified by the user;

wherein the step (A) comprises steps of:

(A)(1) calculating the relevancy threshold as a function of time;

(A)(2) determining whether the relevancy scores of the incoming messages satisfy the relevancy threshold;

(A)(3) delivering to the user message information derived from those incoming messages whose relevancy scores satisfy the relevancy threshold; and (A)(4) adjusting the relevancy threshold when it is determined that at least one of the relevancy scores satisfies the relevancy threshold.

50. The computer-readable medium of claim 49, wherein the step (A)(1) comprises a step of:

(A)(1)(a) calculating the relevancy threshold as a function of time that is specified by the user.

51. The computer-readable medium of claim 50, wherein the step (A)(1)(a) comprises steps of:

receiving user volume input from the user, the user volume input indicating a desired frequency of message delivery to the user; and calculating the function of time based on the user volume input.

52. The computer-readable medium of claim 49, wherein the step (A)(4) comprises a step of:

adjusting the relevancy threshold by a function of the difference between the relevancy threshold and a maximum relevancy value.

53. The computer-readable medium of claim 49, wherein the step (A)(4) comprises a step of:

adjusting the relevancy threshold by an amount specified by the user.

\* \* \* \* \*

UNITED STATES PATENT AND TRADEMARK OFFICE
CERTIFICATE OF CORRECTION

PATENT NO.    : 6,571,238 B1
DATED         : May 27, 2003
INVENTOR(S)   : Pollack et al.

It is certified that error appears in the above-identified patent and that said Letters Patent is hereby corrected as shown below:

Column 11,
Line 64, delete "Information" and insert -- information --;

Column 14,
Line 9, delete "derive" and insert -- derived --.

Signed and Sealed this

Nineteenth Day of August, 2003

JAMES E. ROGAN
*Director of the United States Patent and Trademark Office*